United States Patent
Adendorff et al.

(10) Patent No.: US 8,428,982 B2
(45) Date of Patent: Apr. 23, 2013

(54) MONITORING BUSINESS PERFORMANCE (75) Inventors: Michael Adendorff, Ottawa (CA); Tom Fazal, Ottawa (CA); Simon Palmer, London (GB)

(73) Assignee: International Business Machines Corporation, Armonk, NY (US)

( * ) Notice: Subject to any disclaimer, the term of this patent is extended or adjusted under 35 U.S.C. 154(b) by 2558 days.

(21) Appl. No.: 10/663,345

(22) Filed: Sep. 15, 2003

(65) Prior Publication Data

US 2004/0102926 A1 May 27, 2004

(30) Foreign Application Priority Data

Nov. 26, 2002 (CA) .................................... 2412747

(51) Int. Cl.
*G06Q 10/00* (2012.01)
(52) U.S. Cl.
USPC ...................................................... 705/7.11
(58) Field of Classification Search ................. 705/7.11, 705/7.39
See application file for complete search history.

(56) References Cited

U.S. PATENT DOCUMENTS

| 5,907,490 | A | 5/1999 | Oliver |
| 6,424,979 | B1 | 7/2002 | Livingston et al. |
| 6,668,253 | B1* | 12/2003 | Thompson et al. ................. 1/1 |
| 2002/0052862 | A1* | 5/2002 | Scott et al. ........................ 707/1 |
| 2002/0099578 | A1 | 7/2002 | Eicher, Jr. et al. |
| 2002/0194042 | A1* | 12/2002 | Sands ............................... 705/7 |
| 2003/0150908 | A1* | 8/2003 | Pokorny et al. .............. 235/375 |

FOREIGN PATENT DOCUMENTS

| WO | WO 01/88769 A1 | 11/2001 |
| WO | WO 01/88769 A2 * | 11/2001 |

OTHER PUBLICATIONS

"Benchmarking business processes in software production: a case study", Seen, Megan;Beaumont, Nicholas;Mingins, Christine Benchmarking; 2001; 8, 4 p. 262.*

* cited by examiner

*Primary Examiner* — Mark A Fleischer
(74) *Attorney, Agent, or Firm* — Stephen J. Walder, Jr.

(57) ABSTRACT

A performance monitoring system receives data from one or more data sources. It transforms the received data into the performance information relating to predefined Key Performance Indicators (KPIs); and stores it into a KPI store. The system also calculates scores based on the received data and the performance information stored in the KPI store. Thus, the system can indicate changes in the KPIs through an information presentation unit.

22 Claims, 10 Drawing Sheets

| Year | Month | Day | Reference | Value Type | Value | Source | Date |
|---|---|---|---|---|---|---|---|
| 2002 | 05 | 31 | Revenue - North America | Target | 5,000,000 | SAP | 2002/05/21 |
| 2002 | 05 | 31 | Revenue - North America | Forecast | 5,120,350 | SFA | 2002/05/21 |
| 2002 | 05 | 1 | Revenue - North America | Actual | 54,742 | POS | 2002/05/21 |
| 2002 | 05 | 1 | Revenue - North America | Actual | 28,353 | WEB | 2002/05/21 |
| 2002 | 05 | 1 | Revenue - North America | Actual | 10,843 | Contracts_cube | 2002/05/21 |
| | | | | | | | |

MONITORING BUSINESS PERFORMANCE

This invention relates to a system and method for monitoring business performance.

BACKGROUND OF THE INVENTION

In order to manage a business, it is important to understand how the business is performing. Many organizations store various performance data, such as sales amounts, revenues and account receivables. Organizations use those data to evaluate their business performance.

There exist monitoring tools available for assisting users to monitor some performance data. Those traditional monitoring tools are rigid in their presentation of data. Presentation is driven by an author's view on the business, rather than the performance metrics and their status. Those tools display only pre-set views of specific items as determined by an author of the tool at the time of implementation. Analysis of displayed values may be possible, but it is limited to the pre-set views of specific items. Also, in many organizations, each department has its own store of performance related data and its own definitions of metrics. Those tools may be sufficient for department heads to monitor the performance within the departments. However, those tools are often not sufficient for users who need to see a common, aligned view of business performance of the entire organization. Furthermore, traditional performance monitoring tools do not adapt well to changes in business priorities, initiatives and processes. An authored, rigid display of performance data must be frequently edited to keep up to date with business changes. Editing is cumbersome and requires special skills.

Some existing comprehensive systems provide functions for analysing problems, but those systems are too difficult to use without special training.

Also, in order to provide better views of business performance, scorecard systems are proposed. Scorecard systems give scores to values to indicate values are good or bad. This improves intuitive understanding of values. However, existing scorecard systems are suitable for a department scale analysis and do not give overall views or more in-depth view of the performance of their business.

It is therefore desirable to provide an improved mechanism to allow users to easily monitor and analyse performance of their business.

SUMMARY OF THE INVENTION

It is an object of the invention to provide a novel system and method for monitoring business performance that obviates or mitigates at least one of the disadvantages of existing systems.

The invention uses scores calculated for various Key Performance Indicators (KPIs) to present business performance information to users. In an aspect, the invention can monitor changes in KPIs. In another aspect, the invention allows flexible sorting and/or filtering of KPIs driven by viewers during the monitoring operation.

In accordance with an aspect of the present invention, there is provided a performance monitoring system comprising a staging area, a KPI store, a loader and an information presentation unit. The staging area is provided for receiving data from one or more data sources. The KPI store is provided for storing performance information relating to predefined Key Performance Indicators (KPIs). The loader is provided for transforming the received data into the performance information relating to the KPIs, calculating scores based on the received data and the performance information stored in the KPI store to indicate changes in the KPIs, and loading the performance information including the scores into the KPI store. The information presentation unit is provided for presenting the performance information to a user.

In accordance with another aspect of the invention, there is provided a performance monitoring system comprising a staging area, a KPI store, a loader and an information presentation unit. The staging area is provided for receiving data from one or more data sources. The KPI store is provided for storing performance information relating to predefined Key Performance Indicators (KPIs). The loader is provided for transforming the received data into the performance information relating to the KPIs, and loading the performance information including the scores into the KPI store. The information presentation unit is provided for presenting the performance information to a viewer, the information presentation unit having a viewer driven sorter for allowing the viewer to sort the performance information using the scores stored in the KPI store.

In accordance with another aspect of the invention, there is provided a method for monitoring business performance. The method comprises steps of receiving data from one or more data sources; transforming the received data into performance information relating to predefined Key Performance Indicators (KPIs); storing the performance information into a KPI store; calculating scores based on the received data and the performance information stored in the KPI store to indicate changes in the KPIs; loading the performance information including the scores into the KPI store; and presenting the performance information to a user.

In accordance with another aspect of the invention, there is provided a method for monitoring performance comprising the steps of receiving data from one or more data sources; storing in a KPI store performance information relating to predefined Key Performance Indicators (KPIs); transforming the received data into the performance information relating to the KPIs; loading the performance information including the scores into the KPI store; and presenting the performance information to a viewer, allowing the viewer to sort the performance information using the scores stored in the KPI store.

In accordance with another aspect of the invention, there is provided a computer readable medium storing the instructions and/or statements for use in the execution in a computer of either of the above methods for monitoring business performance.

In accordance with another aspect of the invention, there is provided electronic signals for use in the execution in a computer of either of the above methods for monitoring business performance.

In accordance with another aspect of the invention, there is provided a computer program product for use in the execution in a computer of a method for monitoring business performance. The computer program product comprises a module for receiving data from one or more data sources; a module for transforming the received data into performance information relating to predefined Key Performance Indicators (KPIs); a module for storing the performance information into a KPI store; a module for calculating scores based on the received data and the performance information stored in the KPI store to indicate changes in the KPIs; a module for loading the performance information including the scores into the KPI store; and a module for presenting the performance information to a user.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
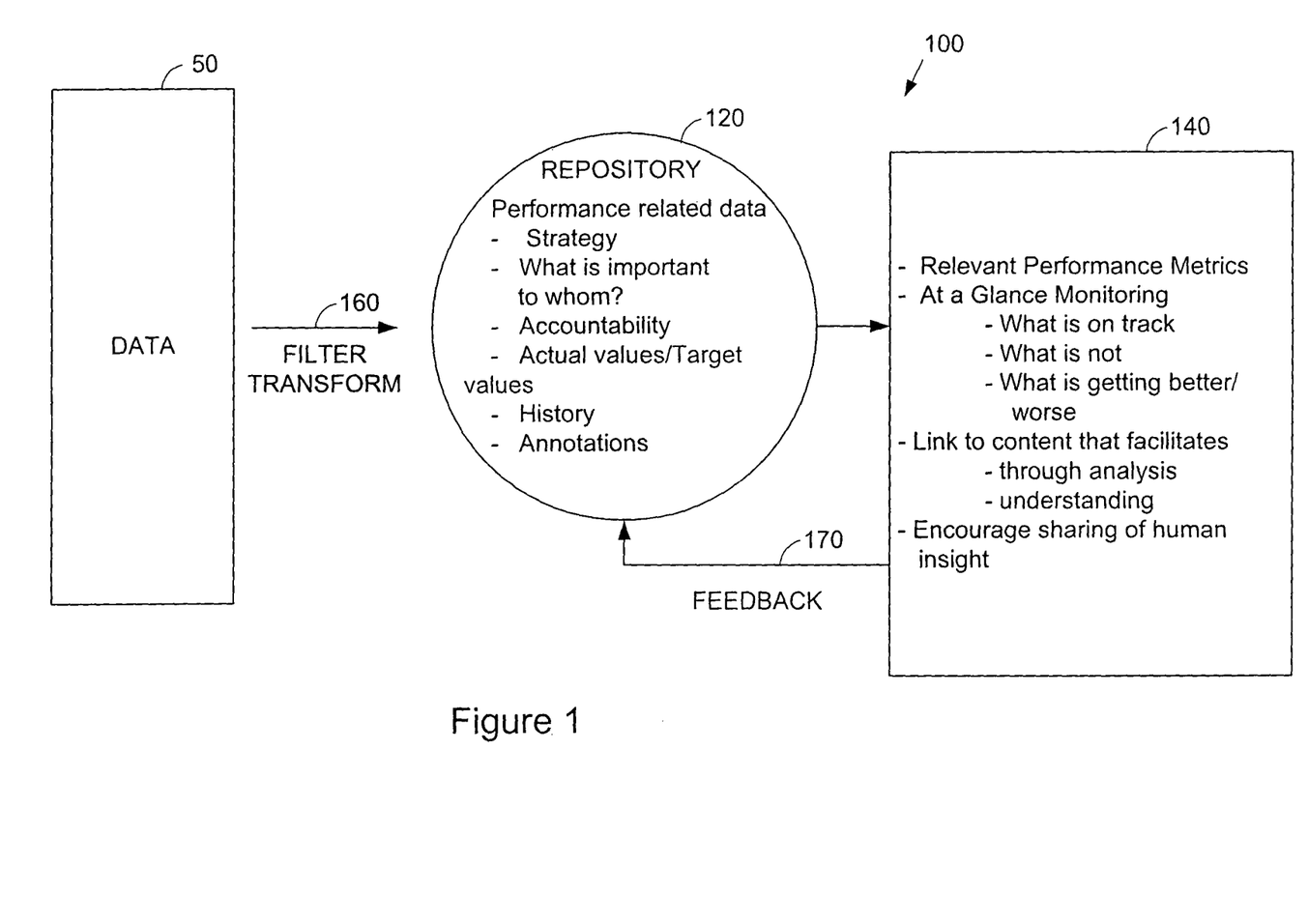
FIG. 1 is a diagram showing a business overview of a performance managing system in accordance with an embodiment of the invention.
Figure 2:
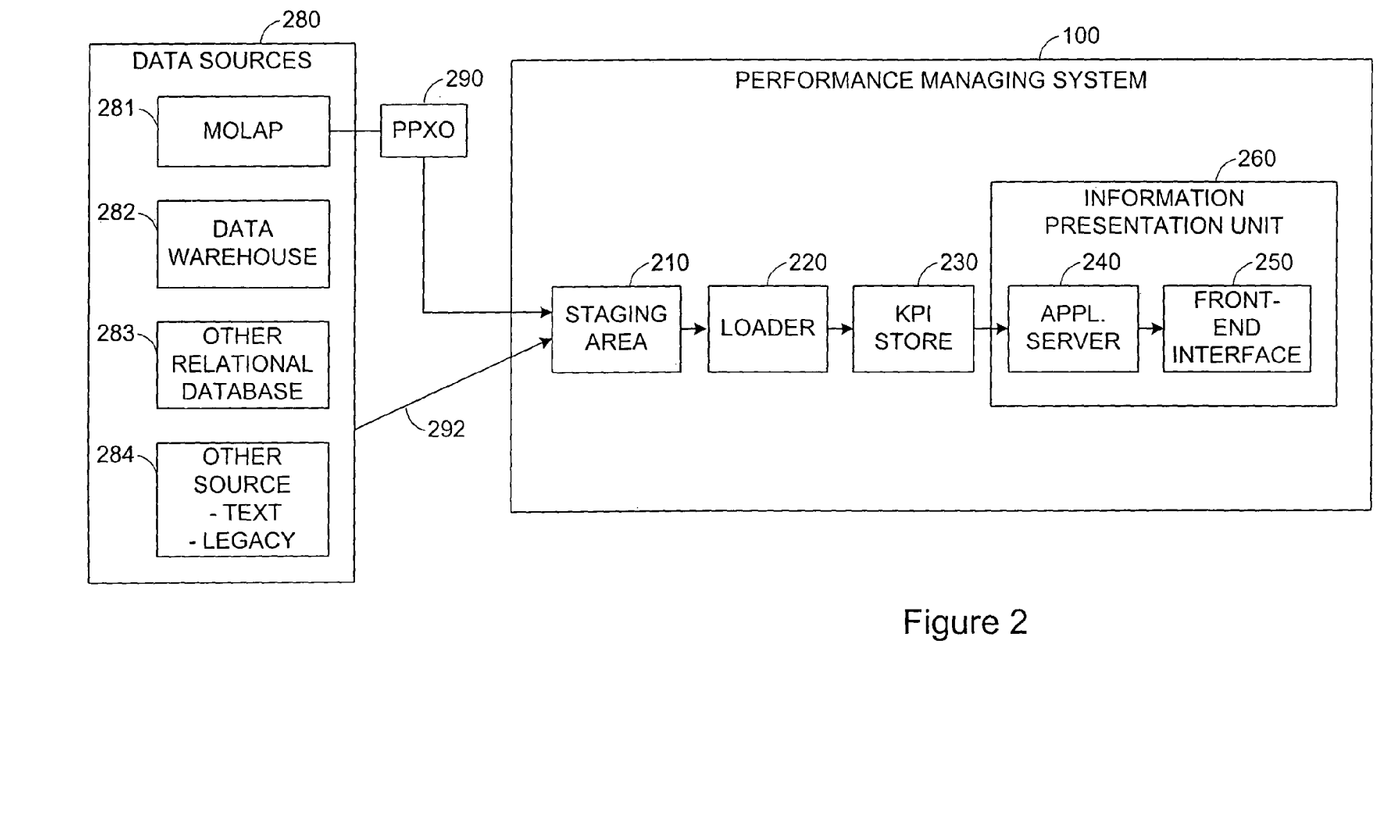
FIG. 2 is a diagram showing a technical overview of the performance managing system shown in FIG. 1.

Referring to FIGS. 1 and 2, a performance monitoring system 100 according to an embodiment of the present invention is described. The performance monitoring system 100 is suitably used to monitor business performances of an organization. The business of the organization may or may not be of profitable.

FIG. 1 illustrates a business overview of the performance monitoring system 100, showing the general functions of the performance monitoring system 100. The performance monitoring system 100 takes data 50 and organizes it into a performance related data repository 120. Data 50 may be stored in one or more data sources. Typically most organizations store data in multiple data sources. When data 50 is taken, the performance monitoring system 100 typically filters the data with some criteria and transforms it into performance related data which is in a suitable form for the performance monitoring system 100 (160).

The performance related data repository 120 stores performance related data that describes topics such as the strategy of the organization, indicators that are important to understand the business performance, i.e., Key Performance Indicators (KPIs), and to whom the KPIs are important, accountability for aspects of organizational performance, actual and target values of indicators over time, the history of values and any annotations including comments that users make about performance.

The performance related data repository 120 also covers usage and impact analysis. For example, the performance related data repository 120 can be used to analyse which users using which indicators, and which indicators are cross references to which other objects in the repository 120.

The performance monitoring system 100 provides users with information 140 about the performance of their organization by taking data 50 and transforms it into the performance related data repository 120. For example, the performance monitoring system 100 provides users with relevant performance metrics of things that are relevant to the users. The metrics gives the users at-a-glance monitoring of the relevant things, e.g., what business activities are on track, what are not on track, which are getting better and which are getting worse. The performance monitoring system 100 provides the at-a-glance monitoring in a way that allows users different ways of monitoring. The users can monitor in ways that are conducive to their own style of management. The performance monitoring system 100 not only allows users to follow pre-defined navigation paths and structures that they have set up, but also allows users to be guided by what has been happening in the data.

The performance monitoring system 100 also uses the performance related data repository 120 to link performance related data to other sources of information that assist users to have a thorough understanding of what is going on, and to analyse and find the causes of any performance anomaly. The performance monitoring system 100 also encourages sharing of human insights on performance related data by allowing users to feedback (170) their comments into the performance monitoring system 100 which are then available for other users to view.

FIG. 2 is a technical overview of the performance monitoring system 100. The performance monitoring system 100 comprises staging area 210, loader 220, KPI store 230 and an information presentation unit 260. The information presentation unit 260 comprises an application server 240 and a front-end interface 250.

The performance monitoring system 100 takes data from one or more data sources 280 that stores data relating to business performance. Examples of potential data sources 280 include typical data sources that organizations generally use, such as, Multidimensional OnLine Analytical Processing (MOLAP) cubes 281, relational data warehouses 282, other relational data source 284, such as Enterprise Resource Planning systems (ERPs) or custom developed systems, and other data source 284 such as legacy systems or textural data, e.g., Exel. All of these are potential data sources for business performance data.

The performance monitoring system 100 accesses data sources 280 through a data load mechanism. For example, the performance monitoring system 100 may use a utility PPXO 290 uses for Cognos Power Cube or MOLAP Cube 281. The utility PPXO 290 automatically extracts data from the cube 281 and loads it into the staging area 210. For relational data warehouse 282, other relational data source 283 or other data source 284, the performance monitoring system 100 uses custom load scripts or Extract, Transform, Load (ETL) process 292 to extract the data from the source and move it into the staging area 210.

The staging area 210 receives data from data sources 280. Loads of the staging area do not impact performance of the system. This, it is possible to load the staging area at any time of day. 210. The staging area 210 is used primarily for bulk loading of data and metadata. It is desirable that the staging area 210 contains the data that has changed since the last run, rather than the entire data including unchanged data. The performance monitoring system 100 does not have to rebuild the entire staging area 210 for each load of data The staging area 210 is read by the loader 220. The loader 220 has a load function and a calculation function. The loader 220 reads the staging area 210 and moves data into the KPI store 230 at the same time transforming and scoring the data to output performance information which is in a form suitable for the use by the performance monitoring system 100. The loader 220 also calculates scores for numeric KPIs. A score is a numeric indication of the performance of a particular KPI.

KPIs to be stored in the KPI store 230 are preselected by a system administrator to reflect the business performance. For example, if 90% of the revenue in North America come from the sales of top 10 products, the system administrator selects the sales of these ten products as KPIs to monitor as well as the revenue in North America as another KPI. The performance monitoring system 100 provides users with performance information of the revenue in North America as represented by the ten products, while allowing users to drill down for each product. Thus, the users can understand the overall tendency of the performance at glance, as well as the performance of each product by drilling down to each product. In existing monitoring tools, the designer of tools could select only a relatively small number of KPIs in order to fit the monitor results within pre-set views. In the performance monitoring system 100, large number of KPIs can be selected because the KPIs can be sorted and/or filtered as viewer's selection to display desired results, as further described below.

The KPI store 230 stores the performance information including values of Key Performance Indicators (KPIs) and other relevant data. Once the performance information is in the KPI store 230, the information is made available to users through the information presentation unit 260.

The user information presentation unit 260 typically uses a web application server 240 and a web based front-end interface 250. The front-end interface 250 provides users with business performance information, e.g., insight as to what is going on in their business, allowing the users to manage any problems found in the business performance. The front-end interface 250 presents the performance information in a way to guide users' monitoring sessions and their exploration of performance.

Examples and details of each element of the performance monitoring system 100 are further described referring to FIGS. 3-12.

Figure 3:
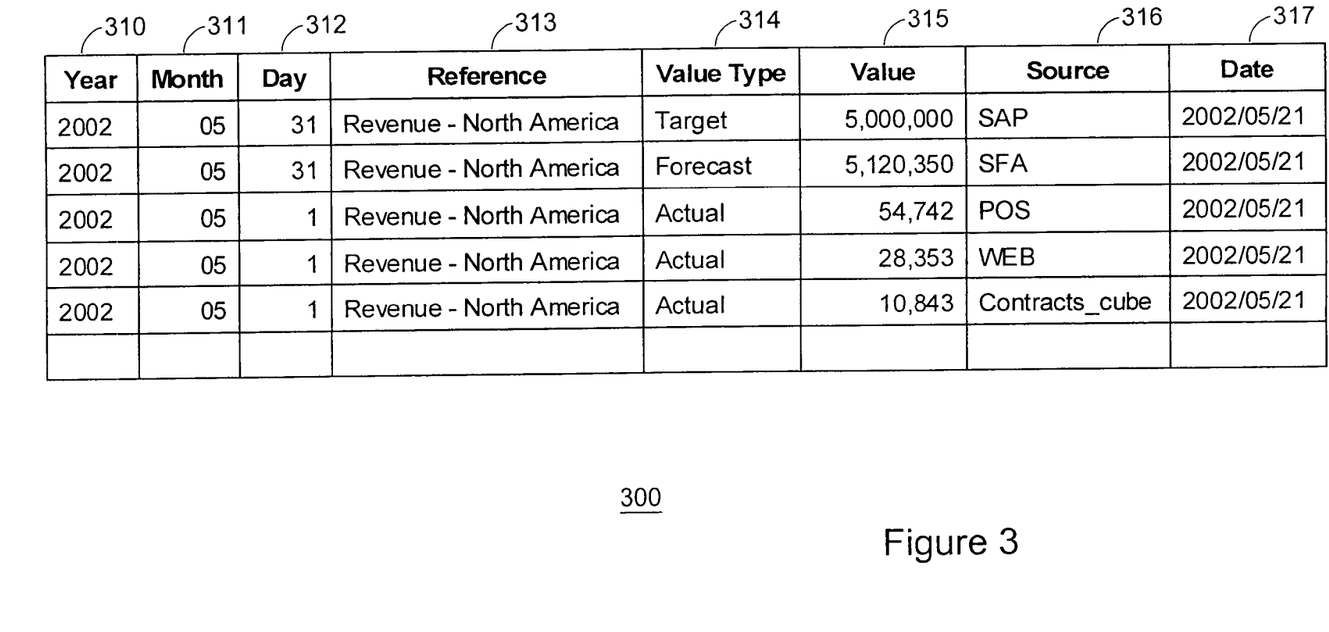
FIG. 3 is a diagram showing an example of a staging area data structure.

FIG. 3 is an example data structure 300 in the staging area 210. The staging area 210 can contain values of various value types and aggregate data from different data sources.

The data structure 300 contains a series of data columns 310-312 relating to the time under which any particular row of staging area data is registered. The data structure 300 shows year 310, month 311, and day 312 to which the data applies. The staging area data structure 300 also contains columns relating to reference 313, value type 314, value 315, source 316, and date 317. The reference 313 is the method of describing what KPI the row indicates. The data structure 300 can contain not only actual values, but also target values or any other user defined values such as forecast values, or benchmark values. The value type 314 indicates which value 315 is stored in the relevant row. The source 316 indicates a data source from which the data comes. The date 317 indicates when the data reached the staging area 210.

For example, the first row indicates that for the full month of May 2002 a target value defined for Revenue in North America on May 21, 2002 is $5,000,000 according to SAP. The second row shows that a forecast value for the full month of May 2002 that was gathered on May 21, 2002 from Excels Force Automation system (SFA) is $5,120,350.

The staging area 210 receives daily actual values in a more detailed level than target and forecast values. For example, the third low in the data structure 300 shows that, on the first of May, the staging area 210 received actual values from three different systems for Revenue in North America: $54,742 from a Point-Of-Sale (POS) system, $28,353 from a web system and $10,843 from a contracts cube.

It is desirable that the staging in the staging area 210 is incremental, i.e., the staging area 210 stages only new values that have changed or added since the last stage because the full data set does not have to be provided for the KPI store 230 each time, in corporation with the loader 220 as described below. The staging area 210 may be configured in two ways for each KPI: for a new value received during a selected time period, replace the new value for an existing value in the KPI store 230, or add the new value to the KPI store 230. For example, the staging area 210 shown in FIG. 3 received new actual values of $54,742, $28,353 and $10,843. If the KPI store 230 already stores a value of $2,500,000 for Revenue in North America, the staging area 210 may be configured to replace the $2,500,000 with the sum of the actual values, or to add the sum of the actual values to the $2,500,000.

Figure 4:
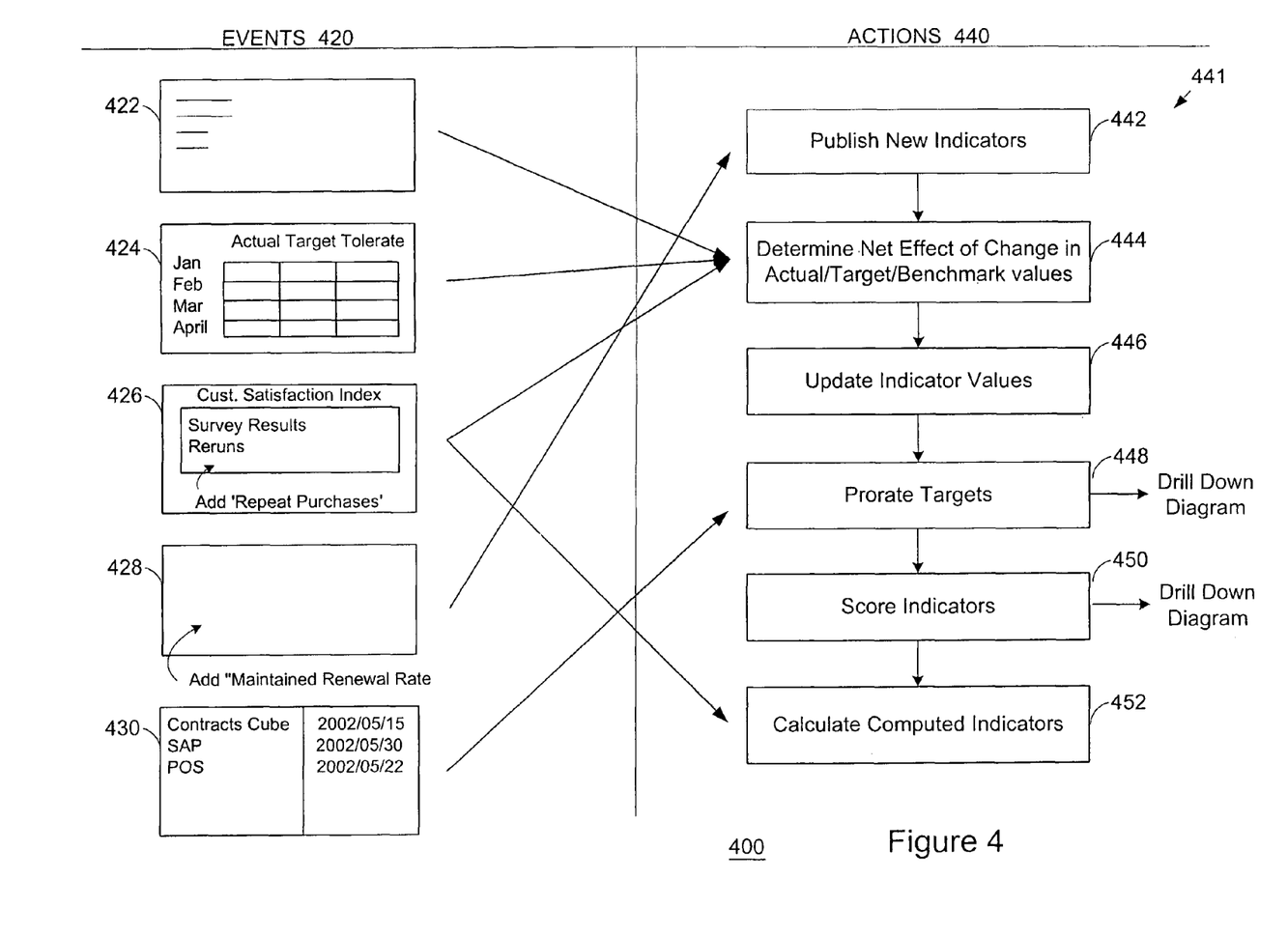
FIG. 4 is a diagram showing examples of events and actions carried out by a loader.

FIG. 4 shows an example of a process 400 carried out by the loader 220 which transforms and scores the received data to load it into the KPI store. The loader process 400 performs a series of transformation and/or calculation actions 440 triggered by events 420. Events 420 are things that happen within the business or within the data set that requires the loader 220 to perform some action or actions.

Examples of events 420 include new data added to the staging area 210 (422), changes to user entered actual or target values (424), changes in definition or calculation methods (426), new KPIs registered in the performance monitoring system 100 (428) and update of data sources (430).

When new data is added to the staging area 210 (422), the new date is processed by the loader 220 if the new data affects one or more KPI value, e.g., a target value, actual value or other value.

The loader 220 preferably has a function to determine which value is a new value by comparing the received value and a corresponding value stored in the KPI store 230. The loader 220 loads only new values to the KPI store 230. Thus, not all of the data is loaded into the performance monitoring system 100 from data sources 280. Certain values are not available in data sources 28, such as some of target values and actual values that need assessment by users. Those values are captured inside of the performance monitoring system 100, i.e., users enter those values into the performance monitoring system 100. Users may change those user-entered values (424). An example of a change in a target value is that when a target for Revenue for a particular year was originally set as $5 million, the performance monitoring system 100 has automatically prorated the $5 million target over the 12 months. In half way through the year, the user revises the target value to $5.5 million. The loader 220 recalculates the prorating based on the new target value, and also recalculates the performance related data and any scores or status that have been calculated based on those target values, as further described below.

Users may also change the definition of KPIs or calculation methods (426). An example is that a change is made in a calculation method of a Customer Satisfaction Index. Initially the Customer Satisfaction Index was calculated as a result of two other KPIs, one of them being Survey Results and another one being Returns. The new calculation method also uses Repeat Purchases as another KPI to calculate the Customer Satisfaction Index. The new calculation method means that the values of the calculated KPI are redefined.

When a new KPI is added and registered into the performance monitoring system 100 (428), the performance monitoring system 100 now has a KPI that has never been reported before where the performance monitoring system 100 has been in production on the system data for a year already. For example, when a Maintenance Renewal Rate is added to the performance monitoring system 100, the loader 220 attempts to source historical data for that Maintenance Renewal Rate, not just from the day when it is added, but also from the prior history as far back as the other KPIs are loaded or as far back as the user indicates.

When a data source is updated (430), some actions of the loader 220 are also triggered. In the example shown in FIG. 3, three data sources are used to obtain actual values. If the contracts cube was last updated on May 15, SAP was last updated on May 30, and the POS system was last updated on May 22, the data displayed by the performance monitoring system 100 mean differently among those actual values. The data shown for the contracts cube on May 30 that the performance monitoring system 100 is able to display to a user was updated on May 15. This means that even though the data is viewed at May 30, the last time the performance monitoring system 100 loaded the data was May 15 and accordingly, the value looks low. Also, it is relevant to the performance monitoring system 100 to know which data was updated on which date. If the contracts cube is to be updated, for example on May 25, there may be some KPIs for which the performance monitoring system 100 receives no data. In order to reflect the fact that the data source 280 has been updated even though the performance monitoring system 100 have received no data in the staging area 210, that the performance monitoring system 100 prorates the target value so that the user can know that the data is as of May 25 and the target value should have increased. If no data was received, while the data sources are updated, it means that the business is doing worse than the performance on May 15, even though the actual value displayed is unchanged. Thus, the loader 220 processes when the data sources are updated to provide correct views of the business to the user.

Now referring to the flowchart 441, examples of actions 440 that are performed on these events 420 are described. The actions 440 are described in the order of the flowchart 441, but all actions may not be taken every time or additional steps may be taken as needed. Also, these actions may be taken in a different order.

The loader 220 looks at whether any new KPIs exist for publishing (442). The loader 220 determines the net effect of any new data added to the staging area 210, changes entered to actual values or other values, or changes in calculation methods (444). Thus, the performance monitoring system 100 determines differences or changes for KPIs. For example, the original Revenue before new data added to the staging area 210 was $5,000,000. The performance monitoring system 100 received at the staging area 210 a new value of $500,000. The net affect is $500,000. The loader 220 is preset to add the $500,000 to the original $5,000,000, and calculates a new updated set of KPI values reflecting the new value of $5,500,000. The loader 220 updates the KPI values according to the calculated new values (446).

The next step is prorating target values (448). For example, the performance monitoring system 100 has a target value for the month of $50,000,000 for a particular KPI and the actual value achieved is $40,000,000 for the KPI. According to the non-prorated target of $50,000,000, it seems that the business is not doing too well as the actual value is below the target. However, the actual value was as of the middle of the month. Looking at the prorated target for the middle of the month is $25,000,000, the actual value of $40,000,000 at the middle of the month when the target is $50 million probably means that the business is doing well. Thus, using the prorated target values provides more accurate view of the performance.

The performance monitoring system 100 scores to monitor KPIs. There are different types of scores, including "good or bad" and "better or worse".

The performance monitoring system 100 scores to evaluate how good or bad particular KPIs are, based on these prorated target values (450). Also, the performance monitoring system 100 may use tolerance values to calculate scores. This score indicates how good or bad the particular KPI is. The numeric scores may be converted into colour or pattern coded status for display to the user in the front-end interface 250. For example, the scores may be presented as red (bad), yellow (neutral) and green (good).

The performance monitoring system 100 can also compare values from period to period to know whether the KPI has improved or worsen. If a score changes from 100 to 110, the performance monitoring system 100 knows that the KPI has been improved relative to another KPI. KPIs may have different units. For example, one KPI may be monitory and another one may be a percentage. Both KPIs are scored to have a common unit. The scores allow the performance monitoring system 100 to compare different KPIs based on which one of KPIs is better or worse or which one of KPIs has improved the most or got worse in the time period at which the user is looking.

The ability with prorating target values and calculating scores supports the monitoring functions that the performance monitoring system 100 can perform, such as letting users to change target values and guiding users through changes in the values. Thus, the performance monitoring system 100 allows the user to manage problems in the performance. The performance monitoring system 100 provides users with monitoring means which functions more than simply looking at predefined structures of data that the user has set up to manage.

Continuing with the loader action process 441, the last step shown in FIG. 4 is that the performance monitoring system 100 calculates computed KPIs (452). Thee computed KPIs are any calculated KPIs which do not exist in the base data. For example, the performance monitoring system 100 calculates the customer satisfaction index that described above because the performance monitoring system 100 cannot obtain a customer satisfaction index from any data source. The user calculates this index based on what the value of survey results and returns to the performance monitoring system 100.

Figure 5:
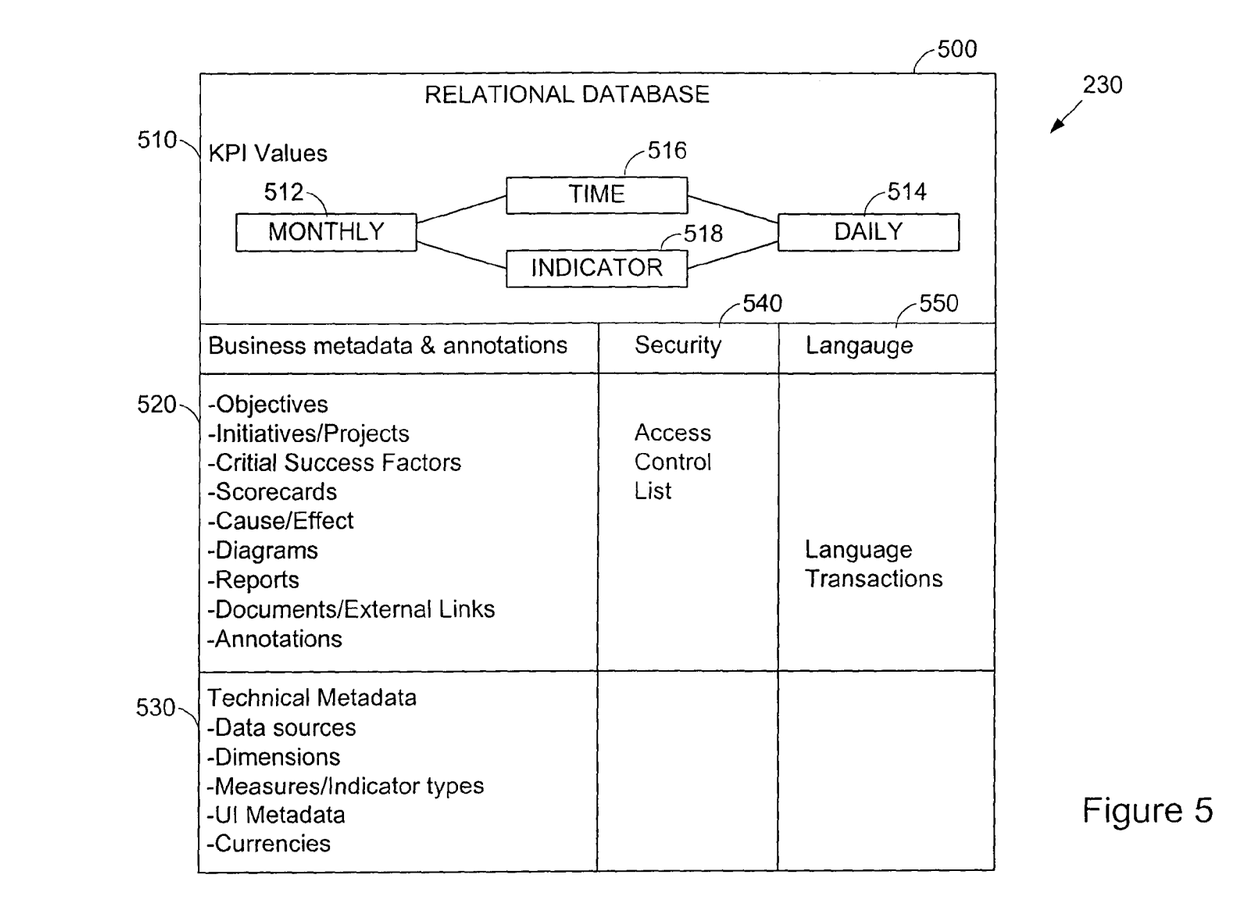
FIG. 5 is a diagram showing an example of a relational database of a KPI store.

FIG. 5 shows an example of the repository of performance information in the KPI store 230. The KPI store 230 is a relational database that has three major statements of information therein. The three major statements are KPI values 510 themselves, business metadata and annotations 520, and technical metadata 530.

The KPI values 510 include the actual values, target values and scores over time. These values are stored by monthly 512 and daily 514. Each value is associated with the time 516, e.g., when the value is received, and a KPI 518 for which the value is received.

The business metadata and annotations 520 drive the exploration and ability to highlight related information for KPIs. Examples of the business metadata 520 that is used by the performance monitoring system 100 include what objections of the company are, what initiatives they have on the go, with which projects does the user work, and what critical success factors of the company are. The business metadata 520 also include scorecards, cause/effect relationships that exist between different KPIs, diagrams, reports which present value related information about a KPI, other documents and external links, such as web pages or policy documents that is available on line. The business metadata 520 may also contain any annotations that are entered by users describing the business performance. These business metadata and annotations 520 describe the strategy and allow the company to map back their performance to their strategy.

The technical metadata 0.530 drives the technical working of the performance monitoring system 100. The technical metadata 530 describes the data sources from which that the performance monitoring system 100 extracts data, the dimensionality, information of the data sources, the measures which are the building blocks of KPIs that exist in the data sources, metadata that drives the actual user interface and metadata which defines what currencies and languages are available to users of the performance monitoring system 100.

The KPI store 230 also has security 540 and language translations 550. The data and metadata in the database 500 is secured through an access control list by the security 540. This means that the database 500 stores which classes of users are allowed access to which data. The database 500 may also store language translations 550 of textual data so that the interface can be displaced in different languages.

Figure 6:
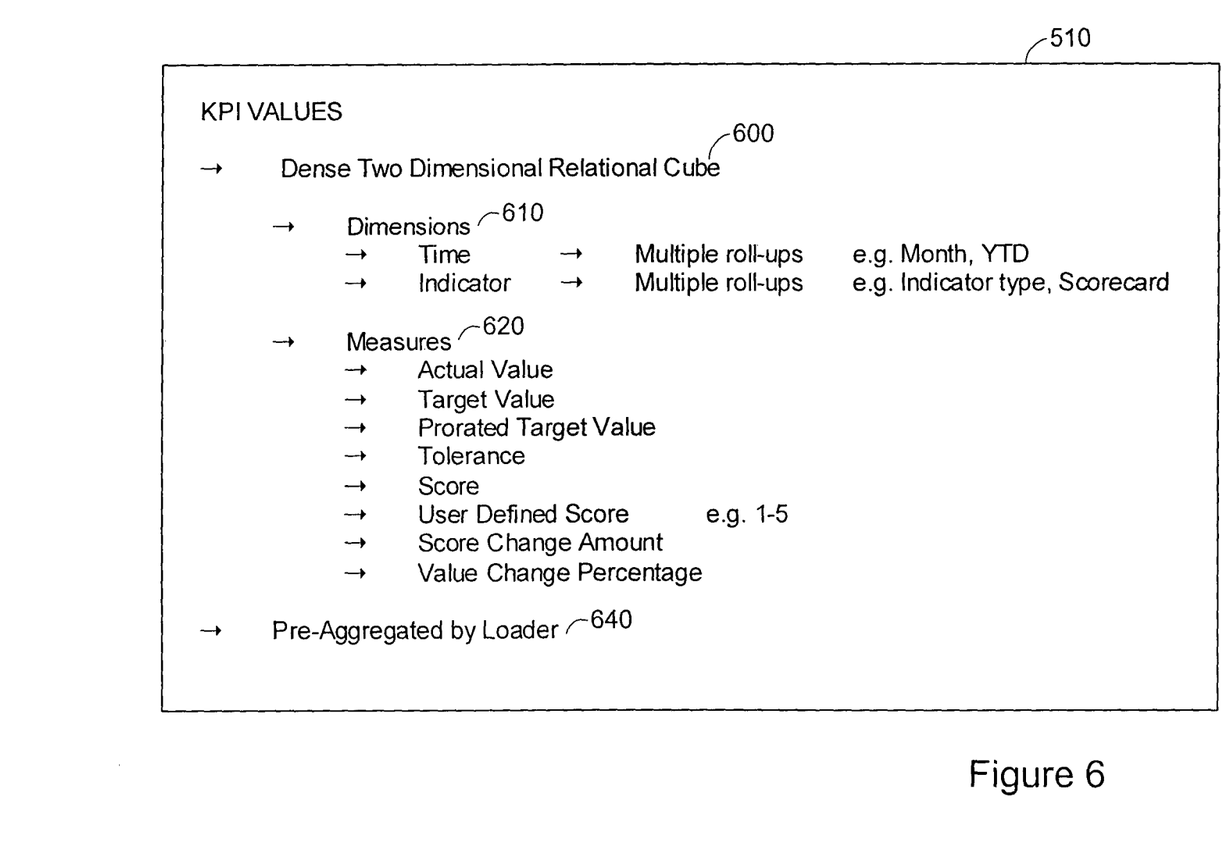
FIG. 6 is a diagram showing examples of KPI values stored in the relational database.

FIG. 6 shows more details of how the KPI values 510 are stored in the database 500. The KPI values are stored in a relational cube 600. The cube 600 a dense cube that contains a value for each combination of items. A cell is provided for each combination regardless it has a value or not.

The cube 600 has two dimensions 610: time and KPIs themselves. Both time and KPIs support multiple roll-ups or break downs. For example, in time, users can roll-up and view data for a month or users can roll-up and view numbers view-to-date. For KPIs, users can roll-up KPIs into a number organizing them into a number of different ways. For example, users may ask questions such as "show me all KPIs of a particular type", "show me KPIs that belong to a particular scorecard" or, "show me KPIs that support a particular strategic objective".

The cube 600 has measures 620. The measures 620 of the cube 600 shown in FIG. 6 are the actual values, the target values, the prorated target values, the tolerance values, the scores that the loader 220 calculated to allow the performance monitoring system 100 to relatively assess good or bad and improved or degraded in performance. The cube 600 also supports user defined measures. Different KPIs can have different user defined measures. Users may have forecasts that they want to have displayed in the performance monitoring system 100 or they use the forecasts for benchmarks. For example, if a newspaper states that inventory turns for a particular industry should be 10, users may store this value as a benchmark value in this cube as a user defined attribute. Other measures may be a score change amount and value change amount. The score change amount is used to drive the reporting of improvement and degradation.

The KPI values 510 may also include cubes pre-aggregated by the loader process 220. The cube 600 contains a value for a predefined period. For example, if a user is looking at a year to date value, the performance monitoring system 100 does a direct read of that year to date value, rather than calculating the sum of values to date from the component months.

Figure 7:
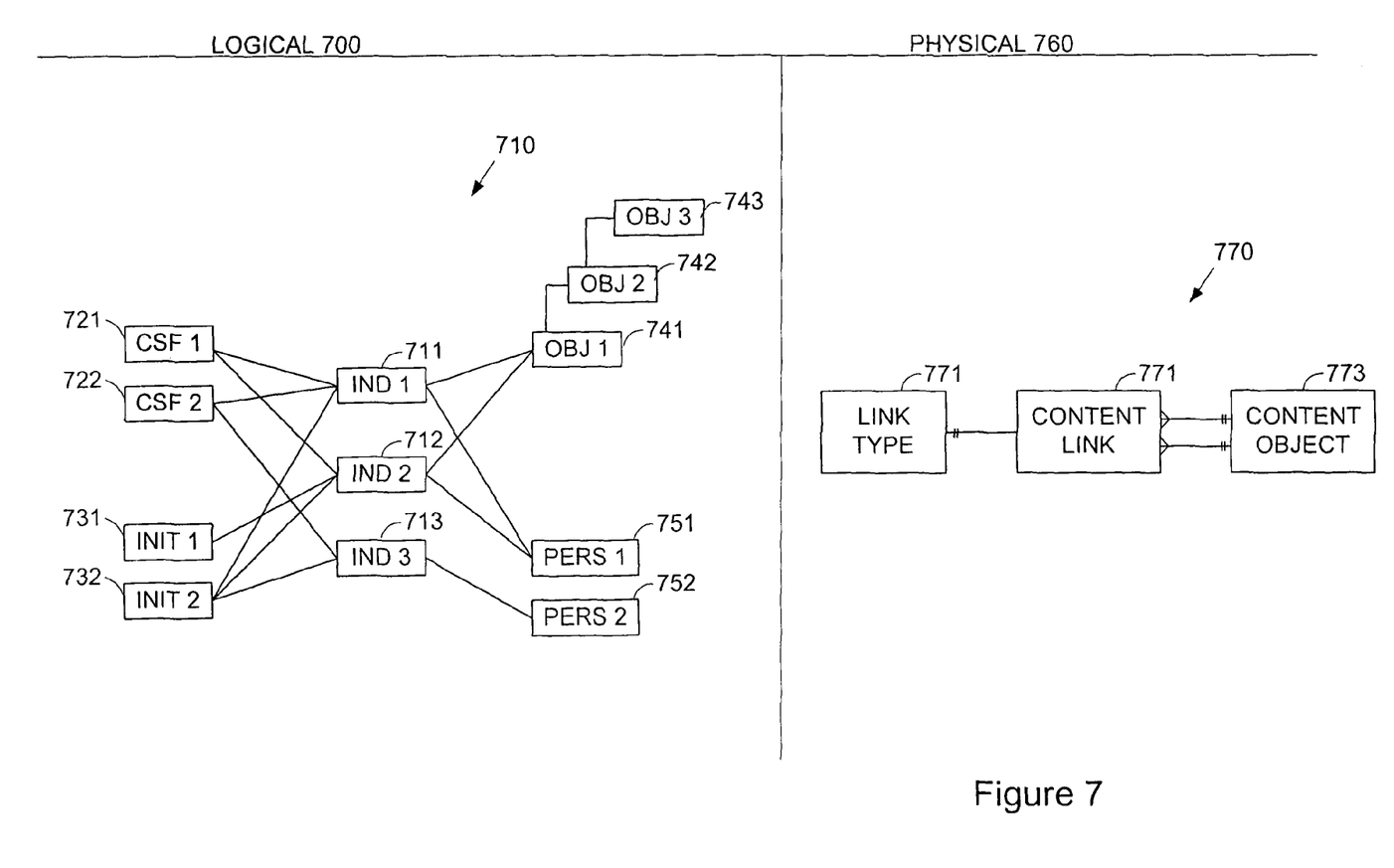
FIG. 7 is a diagram showing an example of business metadata stored in the relational database.

Referring to FIG. 7, the business metadata 520 is now further described. FIG. 7 shows a logical depiction 700 of the business metadata 520 and a physical representation 760 of how that would be stored in the database 500.

In the logical depiction 700, for example, there are three Indicators 711-713. Indicators 711-713 can be associated with various other objects in the database 500, such as Critical Success Factors 721, 722. Critical Success Factor 721 is measured by Indicators 711 and 712, and Critical Success Factor 722 is measured by Indicators 711 and 713. Indicator 711 is associated with both Critical Success Factors 721 and 722. Thus, the objects in the database 500 are stored in a loosely defined network 710, rather than a strict parent-child hierarchy.

The network 710 contains not just Indicators 711-713 and Critical Success Factors 721-722, it may contain other different types of objects to enable exploring Indicators by various angles of business. For example, in FIG. 7, the network 710 also contains Initiative 731 which is measured by Indicators 712 and 713, and Initiative 732 which is measured by Indicators 711 and 713. Also, Objectives 741-743 are included in the network 710. Objective 741 has Indicators 711 and 712 associated therewith. Objectives 741-743 have their own associations: Objective 741 is associated with Objective 742 which is a parent of Objective 743.

The physical representation 760 is a relational data model 770 which describes this logical network 710. The model 770 comprises three tables 771-773. In the centre, there is a content link table 772. Each content link in the content link table 772 describes a particular content object in the content object table 773 to which it is related. There is a row in the content object table 773 for each line in the content link table 772 and each line between each object.

The link type table 771 describes the type of relationship that exists between those objects. In certain cases it is possible to have a relationship between the same types of objects, but there may be a different type of relationship. An example of a different type of relationship is the cause and effect relationship. For example, a relationship exists between a KPI and a KPI that is a cause relationship, and another relationship exists between a KPI and a KPI which is an effect relationship.

Figure 8:
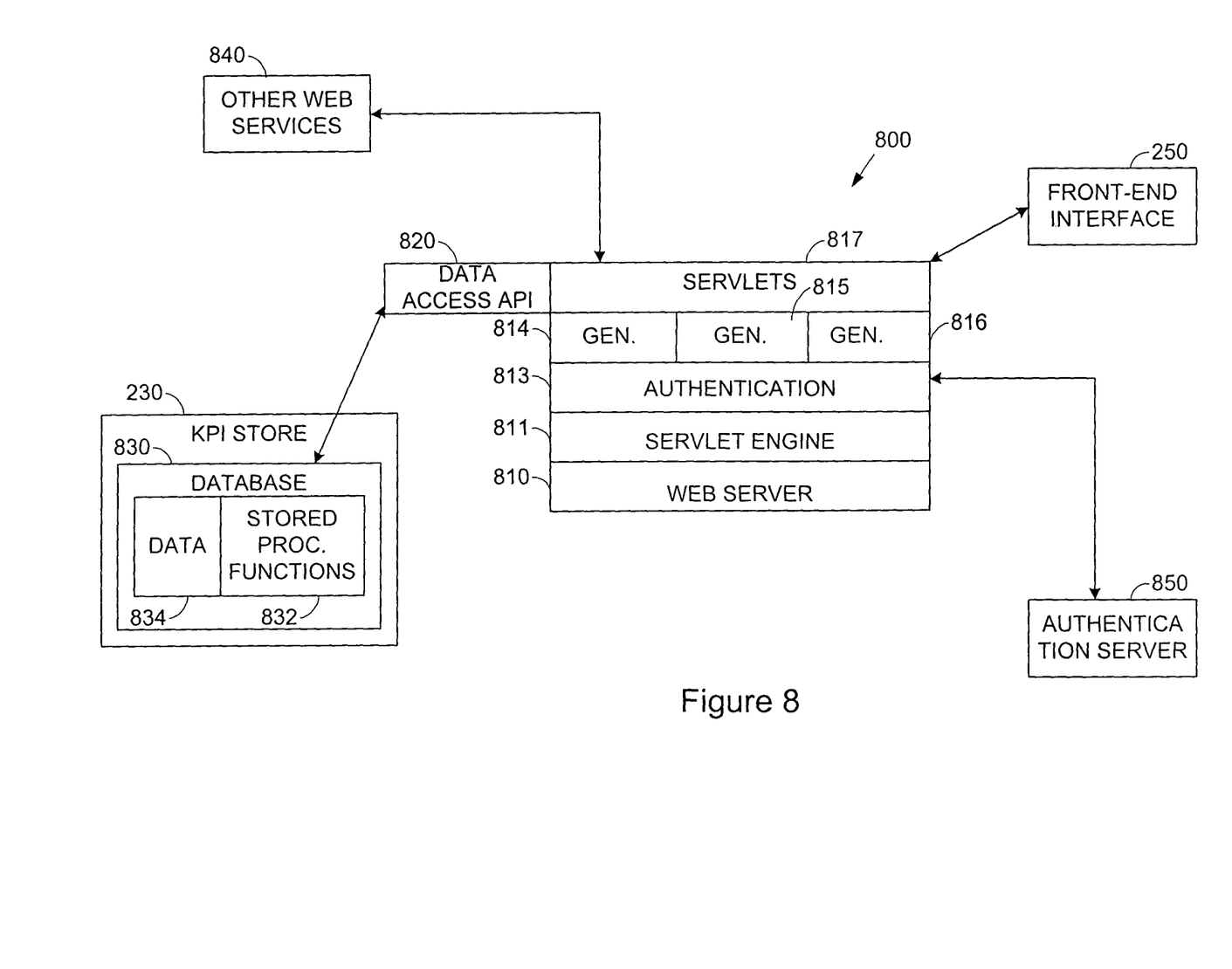
FIG. 8 is a diagram showing an example of a web application server.

FIG. 8 shows an example 800 of the web application server 240. The web application server 800 is provided between the web front-end interface 250 and the KPI store 230. The web application server 800 comprises a web server 810, servlet engine 811, authentication layer 813, servlet generators 814-816, servlets 817 and data access Application Programming Interface (API) 820.

When the web front-end interface 250 requests some data or a page of information, the request is fired off to the web server 810. The web server 810 is running the servlet engine 811. The generators 814-816 generate servlets 817. The generated servlets 817 perform the work for getting data and building web pages.

The servlets 817 access data from the database 830 of the KPI store 230 via the data access API 820. The data access API 820 calls stored procedures and functions 832 in the database 830 to get data 834 out of the database 830. Not all the data for the performance monitoring system 100 may be stored within the relational database 830 of the KPI store 230. Other web service 840 may be used to obtain data from other data sources, e.g., embedded link to data in other data sources. A servlet 817 extracts data from the web service 840 in a similar way to extract data from the relational database 830. It is desirable that all the data and pages requests are authenticated by the authentication layer 813, and the performance monitoring system 100 ensures that the requester is a valid user and also checks the data that the user is asking for to ensure that the user is authorized to view the data. The authentication may be done by another authentication server 850 through the authentication layer 813.

Figure 9:
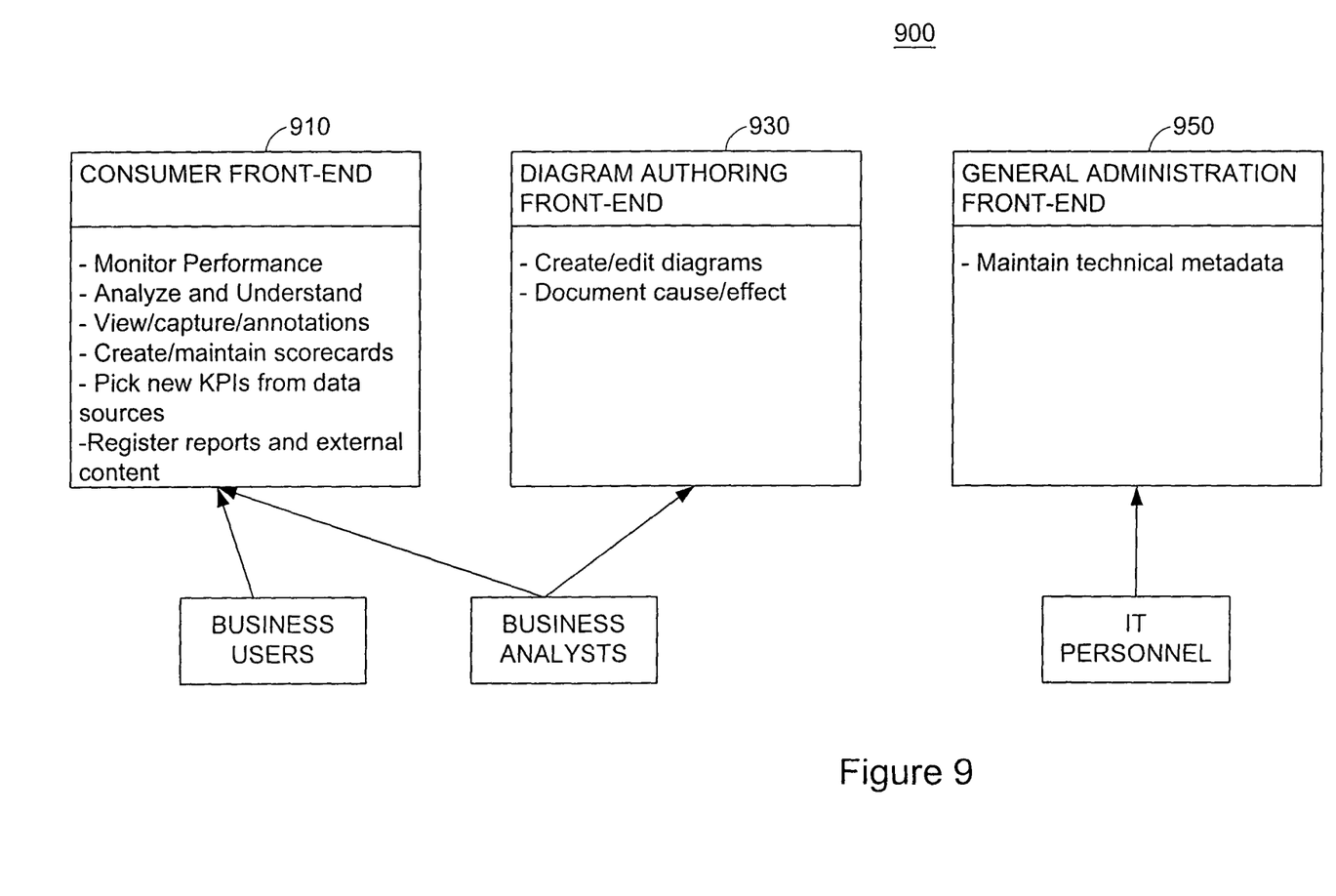
FIG. 9 is a diagram showing an example of a front-end interface.

FIG. 9 shows an example 900 of the web front-end interface 250. The web front-end interface 900 is divided into three main areas: consumer front-end interface 910, diagram authoring front-end interface 930 and general administration front-end interface 950. The consumer front-end interface 910 is the dominant front-end used by consumers or business uses for their regular or ad-hoc monitoring tasks. The diagram authoring front-end interface 930 is typically used by business analysts to create new diagrams that business users have views in the consumer front-end interface 910. The consumer front-end interface 910 may also be useful for business analysts. The administration front-end interface 950 has its primary focus for IT personnel. IT personnel uses the administration front-end interface 950 to maintain mainly technical metadata around the performance monitoring system 100, such as how the performance monitoring system 100 is configured for this particular case, what the data sources are and what the measures and dimensions are.

Returning back to the consumer front-end interface 910, the main function of the consumer front-end interface 910 is monitoring performance. The consumer interface 910 provides users answers to different types of business performance questions, such as what is going on in their business, which processes are performing well or badly, and which products are getting better or worse. The consumer front-end interface 910 presents a structured view of those processes. Not only does the consumer front-end interface 910 gives a high level indication as to for which processes organizations are doing better, well or badly, the consumer front-end interface 910 also gives the users further information to do some analysis to try and understand the root cause of any anomalies. The consumer front-end interface 910 also provides the facility for users to capture annotations to describe any performance anomalies, and share insights into performance and insights into what actions they have taken to improve the performance.

Another aspect of the consumer front-end interface 910 is that it allows business users to create and maintain their own scorecards. Based on KPIs that are already existing, other new scorecards can be assembled. Also the users can use KPIs from cubes or other data sources. If a KPI exists in a data source, such as Cognos Power Cube, users can point to that KPI and specify it so that the KPI is included in the performance monitoring system 100. The consumer front-end interface 910 also allows users to register their own reports and external content that are relevant to KPIs.

Figure 10:
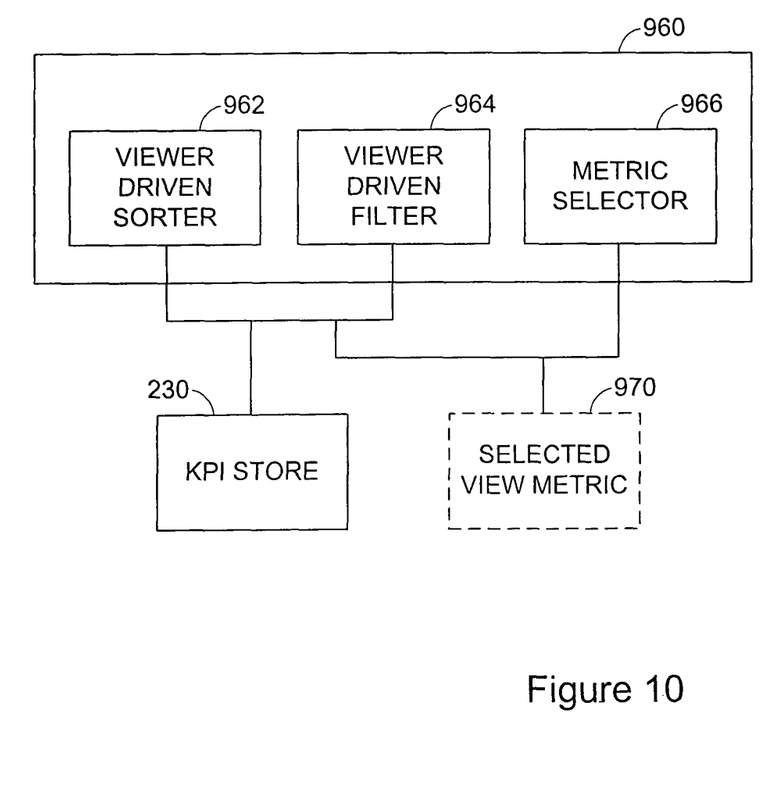
FIG. 10 is a diagram showing an example of a consumer front-end interface.

FIG. 10 shows an example 960 of the consumer front-end interface 910. The consumer front-end interface 960 has a viewer driven sorter 962, a viewer driven filter 964 and a metric selector 966.

The viewer driven sorter 962 allows business users, i.e., viewers who are monitoring the performance information, to sort the performance information during the monitoring operation. Similarly, the viewer driven filter 964 allows viewers to filter the performance information during the monitoring operation. By providing the viewer driven sorter 962 and filter 964, all of the performance information in the KPI store 230 can be made available for the monitoring as they can be sorted and/or filtered by the viewer to display the monitoring results of the desired information.

Furthermore, the metric selector 966 provides viewers options of several types of view formats or metrics, for presenting monitoring results. The metric selector 966 allows the viewer to select a preferred view metric type so that sorted and/or filtered performance information can be displayed in the selected view metric 970 in an intuitive manner. Also, the metric selector 966 provides the viewer with navigation control, i.e., the viewer can easily switch between different types of view metrics.

Thus, the system 100 can provide viewers with flexible viewer driven monitoring based on all of the KPIs available in the KPI store 230. This allows flexible intuitive monitoring of the entire business.

The performance monitoring system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the elements of the performance monitoring system are described separately, however, two or more elements may be provided as a single element, or one or more elements may be shared with other component in the performance monitoring system or other systems.

What is claimed is:

1. A performance monitoring system comprising:
   a staging area receiving data from one or more data sources;
   a KPI store storing performance information relating to Key Performance Indicators (KPIs);
   a loader transforming the received data into the performance information relating to the KPIs, calculating scores based on the received data and the performance information stored in the KPI store to indicate changes in the KPIs such that the scores indicate if associated KPIs are getting better, worse, or is unchanged, and loading the performance information including the scores into the KPI store; and
   an information presentation unit presenting the performance information to a user, wherein the information presentation unit has a front-end interface having a data guided monitoring function that receives a user input and presents relevant performance information in a selected order based on the user input to allow the user to monitor and analyze the performance information using the scores, wherein the staging area receives a target value and an actual value for a KPI, and wherein the loader calculates a score for the KPI based on the actual value and the target value to indicate if the KPI is good, bad or neutral compared to the target value, and calculates another score by comparing the calculated score and a previously calculated score for a previous comparison of a previous actual value to the target value, the previously calculated score being calculated and stored in the KPI store at a previous loading, so that the another score indicates if the KPI is getting better, worse, or is unchanged.

2. The performance monitoring system as claimed in claim 1, wherein the information presentation unit has a function that presents a higher level of the performance information in a form capable of breaking down into a lower level of performance information.

3. The performance monitoring system as claimed in claim 1, wherein the staging area provides to the loader, data that has changed from a last loading.

4. The performance monitoring system as claimed in claim 1, wherein:
  the staging area contains value information for the KPIs and time information relating to one or more time periods to which the value information is applied;
  the loader has a function to determine which KPI is affected by a change in the value information; and
  the KPI store is capable of storing the value information in association with the time information in a relational cube having the time and indicator dimensions, actual values, target values, and score values for the KPIs, and business metadata as a network of content of the metadata.

5. The performance monitoring system as claimed in claim 1, wherein the information presentation unit comprises:
  an application server accessing and managing the performance information stored in the KPI store, wherein the front-end interface has a function that allows a user to add to or modify annotation in the performance information, and wherein the KPI store stores the annotation.

6. The performance monitoring system as claimed in claim 1, wherein the data guided monitoring function presents the performance information of a selected KPI together with related KPIs which are in a cause and effect relation with the selected KPI, and presents the performance information of related KPIs in a diagram to navigate the user through the related KPIs.

7. The performance monitoring system as claimed in claim 6, wherein the data guided monitoring function has a function that presents the performance information for relevant KPIs sorted based on a selected type of scores, and presents the performance information for relevant KPIs filtered and sorted based on the scores of the KPIs.

8. A performance monitoring system comprising:
  a staging area receiving data from one or more data sources;
  a KPI store storing performance information relating to Key Performance Indicators (KPIs);
  a loader transforming the received data into the performance information relating to the KPIs, and loading the performance information including scores into the KPI store wherein the scores indicate if associated KPIs are getting better or worse or unchanged; and
  an information presentation unit presenting the performance information to a viewer, the information presentation unit having a viewer driven sorter and/or a viewer driven filter allowing the viewer to sort and/or filter the performance information using the scores of all or some of the KPIs stored in the KPI store, wherein the staging area receives a target value and an actual value for a KPI, and wherein the loader calculates a score for the KPI based on the actual value and the target value to indicate if the KPI is good, bad or neutral compared to the target value, and calculates another score by comparing the calculated score and a previously calculated score for a previous comparison of a previous actual value to the target value, the previously calculated score being calculated and stored in the KPI store at a previous loading, so that the another score indicates if the KPI is getting better, worse, or is unchanged.

9. The performance monitoring system as claimed in claim 8, wherein the information presentation unit has a function that allows the viewer to add to or modify annotation in the performance, and the KPI store stores the annotation.

10. The performance monitoring system as claimed in claim 9, wherein the information presentation unit has a function that presents multiple view metric types, and has a metric selector that allows the viewer to select a preferred view metric type to present sorted and filtered performance information.

11. The performance monitoring system as claimed in claim 9, wherein:
  the loader has a function that calculates scores based on the received data and the performance information stored in the KPI store to indicate changes in the KPIs, and
  the viewer driven sorter and filter has a function that sorts and filters the performance information based on the scores calculated based on the changes in the KPIs.

12. A method of monitoring business performance, the method comprising:
  using a computer to perform the following operations:
  receiving data from one or more data sources;
  transforming the received data into performance information relating to Key Performance Indicators (KPIs);
  storing the performance information into a KPI store;
  calculating scores based on the received data and the performance information stored in the KPI store to indicate changes in the KPIs such that the scores indicate if associated KPIs are getting better or worse or unchanged;
  loading the performance information including the scores into the KPI store; receiving a user input; and
  presenting the performance information to a user in a selected order based on the user input, using relevant KPIs sorted and/or filtered based on a selected type of scores of the KPIs, to allow the user to monitor and analyze the performance information using the scores, wherein receiving data comprises receiving a target value and an actual value for a KPI, and wherein calculating scores comprises calculating a score for the KPI based on the actual value and the target value to indicate if the KPI is good, bad or neutral compared to the target value, and calculating another score by comparing the calculated score and a previously calculated score for a previous comparison of a previous actual value to the target value, the previously calculated score being calculated and stored in the KPI store at a previous loading, so that the another score indicates if the KPI is getting better, worse, or is unchanged.

13. The method as claimed in claim 12, wherein presenting the performance information comprises presenting a higher level of the performance information in a form capable of breaking down into a lower level of the performance information.

14. The method as claimed in claim 12, wherein receiving data from the one or more data sources makes available data that has changed from a last loading.

15. The method as claimed in claim 12, wherein:
  receiving data from the one or more data sources comprises receiving value information for the KPIs and time information relating to one or more time periods to which the value information is applied;
  calculating scores comprises determining which value information is affected by a change in the value information; and
  storing the performance information comprises storing the value information in association with the time information, actual values, target values and score values for the KPIs in a relational cube having the time and indicator dimensions, and business metadata as a network of content of the metadata.

16. The method as claimed in claim 12 wherein presenting the performance information comprises:
presenting the performance information of a selected KPI together with related KPIs which are in a cause and effect relation with the selected KPI, and presenting the performance information of related KPIs in a diagram to navigate the user through the related KPIs.

17. The method as claimed in claim 12, wherein presenting the performance information comprises allowing the user to add to or modify annotation to the performance information, and wherein storing the performance information comprises storing the annotation in the KPI store.

18. A method of monitoring performance comprising:
using a computer to perform the following operations:
receiving data from one or more data sources;
storing, in a KPI store, performance information relating to Key Performance Indicators (KPIs);
transforming the received data into the performance information relating to the KPIs;
loading the performance information including scores into the KPI store wherein the scores indicate if associated KPIs are getting better or worse or unchanged; and
presenting the performance information to a viewer, allowing the viewer to sort and/or filter the performance information using the scores of all or some of the KPIs stored in the KPI store, wherein receiving data comprises receiving a target value and an actual value for a KPI, and wherein transforming the received data comprises calculating a score for the KPI based on the actual value and the target value to indicate if the KPI is good, bad or neutral compared to the target value, and calculating another score by comparing the calculated score and a previously calculated score for a previous comparison of a previous actual value to the target value, the previously calculated score being calculated and stored in the KPI store at a previous loading, so that the another score indicates if the KPI is getting better, worse, or is unchanged.

19. The method as claimed in claim 18, wherein presenting the performance information comprises allowing the viewer to add to or modify annotation to the performance information, and wherein storing performance information comprises storing the annotation in the KPI store.

20. The method as claimed in claim 19, wherein presenting the performance information comprises providing options of multiple view metric types, and allowing the viewer to select a preferred view metric type to present sorted/filtered performance information.

21. The method as claimed in claim 20, wherein:
loading the performance information comprises calculating scores based on the received data and the performance information stored in the KPI store to indicate changes in the KPIs; and
presenting the performance information comprises allowing the viewer to sort and filter the performance information based on the changes in the KPIs.

22. A non-transitory computer readable medium storing the instructions and/or statements for use in the execution in a computer of a method of monitoring business performance, the method comprising:
receiving data from one or more data sources;
transforming the received data into performance information relating to Key Performance Indicators (KPIs);
storing the performance information into a KPI store; calculating scores based on the received data and the performance information stored in the KPI store to indicate changes in the KPIs such that the scores indicate if associated KPIs are getting better or worse or unchanged;
loading the performance information including the scores into the KPI store; receiving a user input; and
presenting the performance information to a user in a selected order based on the user input, using relevant KPIs sorted and/or filtered based on a selected type of scores of the KPIs so as to allow the user to monitor and analyze the performance information using the scores, wherein receiving data comprises receiving a target value and an actual value for a KPI, and wherein calculating scores comprises calculating a score for the KPI based on the actual value and the target value to indicate if the KPI is good, bad or neutral compared to the target value, and calculating another score by comparing the calculated score and a previously calculated score for a previous comparison of a previous actual value to the target value, the previously calculated score being calculated and stored in the KPI store at a previous loading, so that the another score indicates if the KPI is getting better, worse, or is unchanged.

* * * * *